United States Patent [19]
Van Der Roer

[11] 3,851,747
[45] Dec. 3, 1974

[54] DEVICE FOR TRANSFERRING WORKPIECES FROM A STATIONARY SUPPLY SOURCE TO A MOVING MACHINE

[75] Inventor: Humphrey Alphons Victor Van Der Roer, Freiburg, Switzerland

[73] Assignee: Polytype AG, Frieburg, Switzerland

[22] Filed: Aug. 31, 1972

[21] Appl. No.: 285,303

[30] Foreign Application Priority Data
Sept. 1, 1971 Switzerland.................... 12966/71

[52] U.S. Cl............................................ 198/22 R
[51] Int. Cl............................................ B65g 47/00
[58] Field of Search................... 198/22, 22 B, 20 R

[56] References Cited
UNITED STATES PATENTS
3,330,400  7/1967  Alexander.......................... 198/22 R FOREIGN PATENTS OR APPLICATIONS
542,608  6/1957  Canada............................ 198/20 R Primary Examiner—Richard A. Schacher
Assistant Examiner—Douglas D. Watts
Attorney, Agent, or Firm—Toren, McGeady and Stanger

[57] ABSTRACT

In transporting workpieces from a stationary storage guide to mandrels on a wheel rotating about a shaft, a transfer device is provided which includes a plurality of carrying elements on an endless member for transporting the workpieces from the storage guide to the mandrels. A support arrangement is provided for the endless member and its carrying elements so that the carrying elements, when in alignment with the storage guide, rotate while the axis of the carrying element remains stationary, and when in alignment with the mandrels on the wheel, the carrying elements move at the same speed as the mandrels.

3 Claims, 2 Drawing Figures

DEVICE FOR TRANSFERRING WORKPIECES FROM A STATIONARY SUPPLY SOURCE TO A MOVING MACHINE

SUMMARY OF THE INVENTION

The present invention is directed to a device for transferring workpieces from a stationary supply source to a moving machine and, more particularly, it is directed to an endless member on which carrying elements are attached for transporting the workpieces from the supply source to the moving machine.

In mass production operations, the problem frequently arises of positioning a workpiece on a machine so that work can be performed on the workpiece without interrupting the movement of the machine. If the machine performs a rotary movement about its axis, the problem can be easily solved, for example, by means of a collet on a turning lathe. However, if the machine travels along a path of movement, the problem of moving the workpiece into position is much more difficult to solve.

In one attempted solution, the workpieces to be worked on were shot either extremely rapidly onto the machine or a device was provided which received the workpiece in a stationary position, accelerated the workpiece until it ran for a certain period with the machine and then returned to the starting position.

Therefore, the present invention provides a new solution for the problem under consideration. In accordance with the present invention, an endless member, such as a chain or belt is caused to travel at the same rate of speed as the portion of the machine to which the workpieces are fed. The endless member is provided with links and carrying elements are attached to certain of the links so that they extend laterally and perpendicularly from the endless member. Further, the carrying elements are positioned at equal intervals along the endless member. Supporting members are provided for the endless member so that at the location of the workpiece supply source the endless member travels along a track forming a portion of a circle with the carrying element located on the track having its axis located in a stationary position in alignment with the workpiece supply source. The radius of the track corresponds to the dimension of the center of the carrying element from the center of the endless member. The carrying elements are located on the inner side of the endless member as they move onto the support member forming the curved track for receiving a workpiece from the supply source.

Preferably, multiple positions are provided for charging the workpieces from the stationary supply sources into carrying elements on the endless member. At each of these loading stations, the travel of the endless member is translated by the support member into a rotational movement of the carrying element about a stationary axis.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there is illustrated and described a preferred embodiment of the invention.

DETAILED DESCRIPTION OF THE INVENTION

Figure 1:
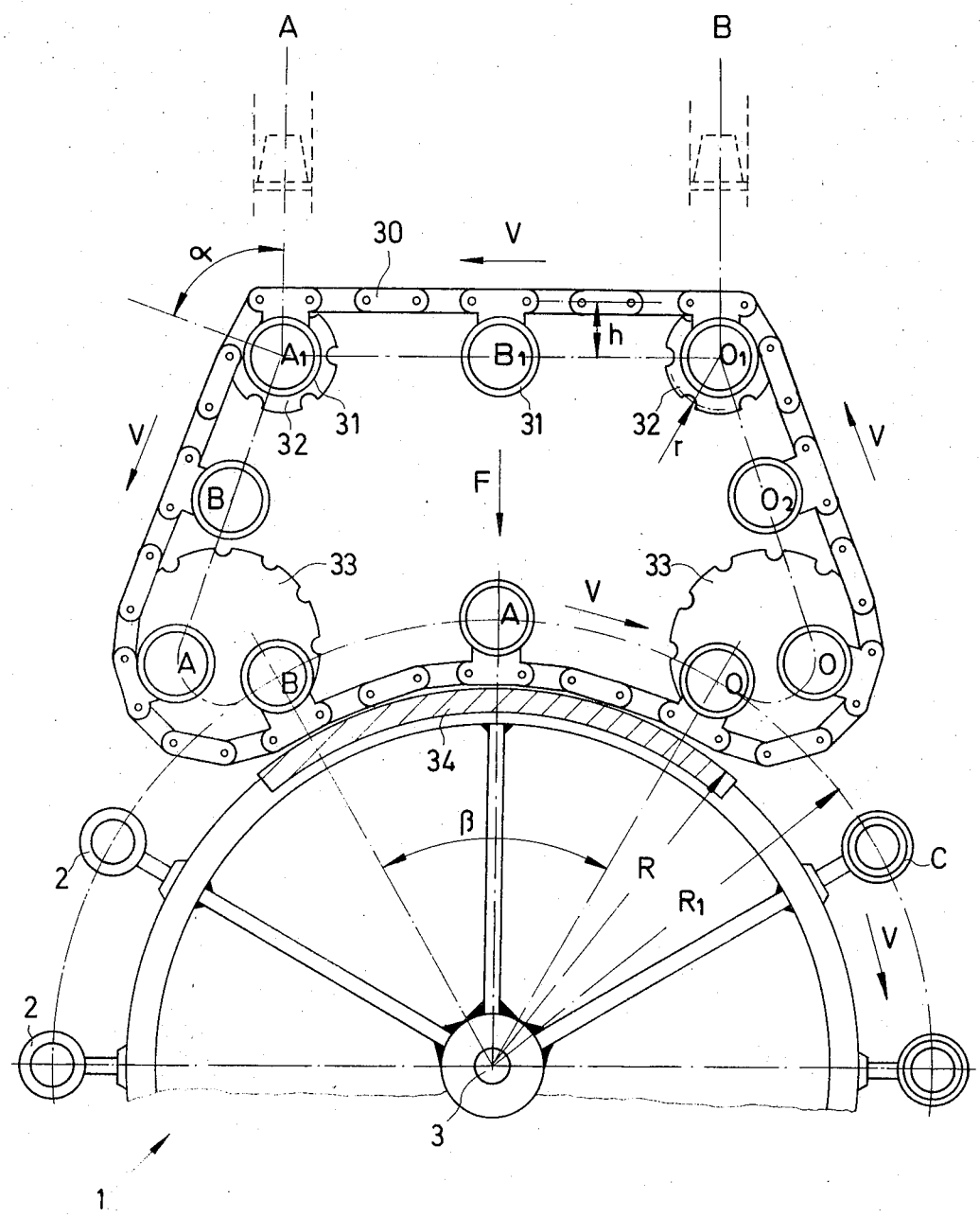
FIG. 1 is a front view of a device, embodying the present invention, for transferring workpieces from a supply source to a machine for working on the workpieces.
Figure 2:
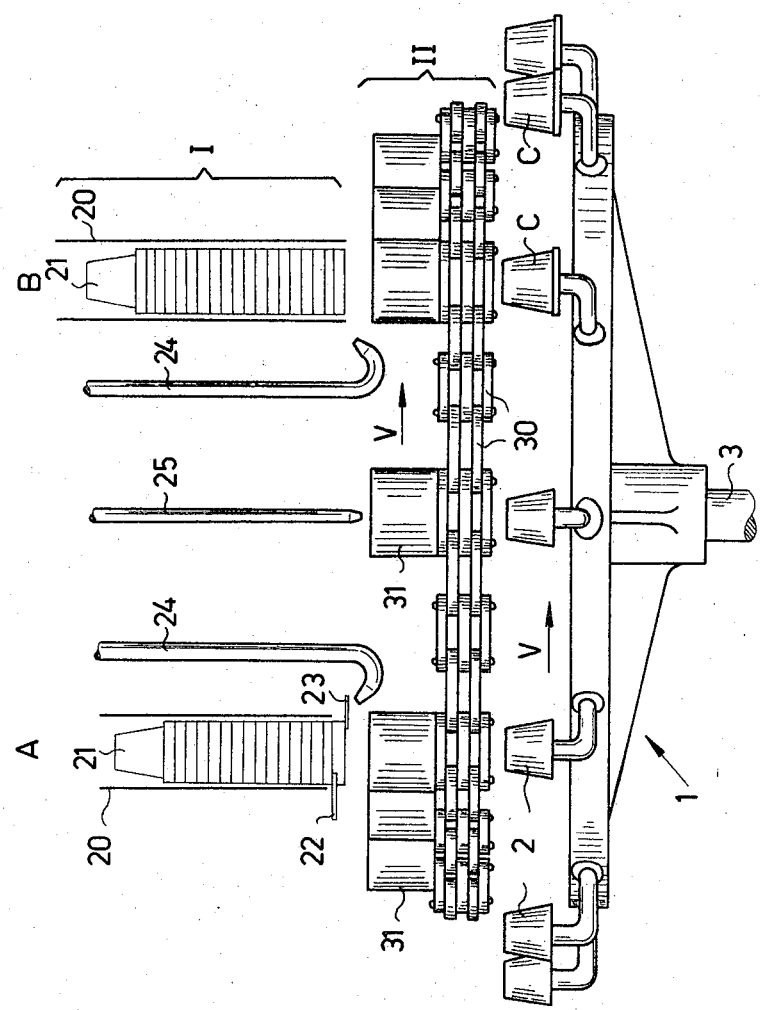
FIG. 2 is a top view of the device shown in FIG. 1.

In FIG. 1 a portion of a machine is shown for performing work on a workpiece, such as on the cups located in the stationary guideways as illustrated in phantom. The machine includes a wheel 1 mounted on a shaft 3 for continuous rotation with the shaft. Equiangularly positioned on the periphery of the wheel 1 are a plurality of mandrels 2. As can be seen in FIG. 2, the mandrels 2 have a configuration adapted to the configuration of the cups supported on the mandrels during the working operation. There are twelve mandrels 2 located on the wheel 1.

As indicated in FIG. 2, the mechanism for feeding the cups to the mandrels 2 on the wheel 1 consists of a stationary part I and a moving part II. In stationary part I two loading stations A, B are provided for introducing cups into the moving part II. At each of the loading stations A, B, the stationary part consists of a vertically positioned guideway 20 each containing a stack 21 of cups. At the outlet end of each guideway, holding fingers 22, 23 are provided which release the front cup and hold the following cup during one poriton of the cycle and then release the following cup and hold it as the new front cup during the remaining portion of the cycle. As can be seen in FIG. 2, the holding finger 23 provides the holding action for the front or leading cup in the guideways 20 while the holding finger 22 provides the holding action for the next following cup.

In each of the loading stations A, B, when the leading cup is released by the holding finger a jet of air is provided from the pipe 24 which directs the leading cup into the moving part II. As can be seen from the arrangement of the pipe 24 in FIG. 2, it directs the air jet into the cup following the leading cup, so that the leading cup is directed into the moving part II.

The moving part II includes an endless link chain 30 which, as shown in FIG. 1, supports ten carrying elements 31. As the chain moves between the loading stations A, B and over the wheel 1 supporting the mandrels 2, it passes over two small sprocket or chain wheels 32 located below the loading stations and two large sprocket wheels 33 positioned adjacent the periphery of the moving wheel 1. As the endless chain 30 moves between the two large chain wheels 33 it moves over a fixed guideway 34 whose center of curvature coincides with the center of the shaft 3. The carrying elements 31 are tubular in form and extend inwardly from the larger ones of the links of the chain 30, note FIG. 2. For the sake of clarity the axles and bearing for the chain wheels 32 and 33 and also the fastening elements for the fixed curve guideway 34 have been omitted from the drawing. As the carrying elements 31 pass with the chain 30 between the small and large chain wheels 32, 33 the axis or center of each carrying element is located on a line extending perpendicularly to the center line of the chain.

The pitch circle radius $r$ of the small sprocket wheels 32, that is the radius of the wheels which engage the links on the chain, corresponds exactly to the dimension $h$ from the center of the carrying elements to the center of the chain. Additionally, the radius $R$ of the radially outer surface of the curved guideway 34, that is the outer surface relative to the axis of the wheel axle 3, is selected so that its center of curvature coincides with the axis of the axle 3 and, accordingly, the centers of the carrying elements 31 move along a circular segment whose radius coincides with the radius $R_1$ of the path of movement of the centers of the mandrels 2.

In the operation of the device, the speed of the center of the mandrels 2 about the center of the wheel 1 is exactly equal to the speed of the centers of the carrying elements 31 as they move along the curved guideway 34 between the larger chain wheels 33. In effecting the transfer of the workpieces or cups, the movement of the chain and the wheel are synchronized with one another. Further, as can be seen in FIG. 1, the spacing of the mandrels 2 on the wheel 1 and of the carrying elements 31 on the chain 30 are arranged so that the centers of the carrying elements 31 are aligned exactly over the centers of the mandrels 2 as the chain moves over the convex surface of the guideway 34. It is during this aligned relationship between the carrying elements and the mandrels that the cup positioned within the carrying element is transferred onto the mandrel. As shown in FIG. 2, a pipe 25 provides a jet of air in displacing the cup from the carrying element onto the mandrel, in FIG. 1 the pipe 25 is located at the point F.

During operation, with both the chain 30 and the wheel 1 moving, there is relatively little time for transferring individual cups from the stationary stacks 21 into the carrying elements 31, and then for transferring the cups from the carrying elements onto the mandrels 2. In this arrangement, as the carrying elements pass the loading stations A, B their centers or axes remain stationary while the carrying element undergoes a rotary motion about the axis. This stationary position of the axis of the carrying elements at the loading stations results from the manner in which the links supporting the carrying elements are moved by the small sprocket wheels 32. As the link supporting a carrying element is engaged by one of the small sprocket wheels 32 it maintains the center of the carrying element in alignment with the center of the sprocket wheel so that, though the link continues to move about the sprocket wheel the center of the carrying element remains stationary for the angular extent of the movement of the small sprocket wheel defined by the angle $\alpha$, note FIG. 1.

The time available for the transfer of a cup from a carrying element 31 to one of the mandrels 2 corresponds to the time it takes a mandrel to traverse the arc subtended by the angle $\beta$, note FIG. 1. As can be seen in FIG. 1, as the chain 30 moves in the direction of the arrow V for the extent of the angle $\beta$ the carrying element on the chain remains in alignment with the mandrel on the wheel. Since the movement of the wheel 1 and the chain 30 are exactly synchronized the mandrel and carrying element remain in axial alignment for their passage through the arc subtended by the angle $\beta$.

As indicated in the drawing, there are two loading stations A, B for feeding the cups from the stationary guideways 20 into the carrying elements 31 on the chain 30. As the chain 30 moves the carrying elements in front of the loading stations A, B, alternate ones of the carrying elements are charged with cups from the loading stations. As mentioned above, as the carrying elements 31 move about the small sprocket wheels 32 under the loading station, though the carrying elements effect a rotary movement about their axes or centers they remain in a stationary position so that the cup can be easily displaced into the carrying element. In FIG. 1 the carrying elements 31 filled from the loading station A are designated with "A" and the carrying elements filled from the loading station B are designated with "B". Further, the carrying elements designated with "O" are empty, since the cups carried by these elements have been transferred to the mandrels 2 in the passage of the chain 30 over the fixed curved guideway 34. In FIG. 1 the carrying element 31 located below the loading station A is being filled with a cup while the following carrying element having the designation "$B_1$" has already received a cup during its passage under the loading station B. As the chain 30 continues to move the carrying element with the designation "$O_1$" will move toward the loading station A and the carrying element with the designation "$O_2$" will move into the loading station B for the receipt of a cup. In this manner the carrying elements 31 are alternately filled from the loading station A, B.

As indicated above, the arrows V illustrate the direction of movement of the chain 30 and also the direction of movement of the wheel 1 and its mandrels 2.

As can be readily appreciated, the transferring device can be equipped with a single loading station or with a plural number of such stations in excess of two. Accordingly, the supporting arrangement for the chain 30 would be constructed to provide the requisite number of stationary locations for the carrying elements and corresponding discharging positions for the carrying elements.

In place of the chain used for transferring the carrying elements, a toothed belt could be used and would be particularly suitable because of the required synchronous operation of the moving part II and the wheel I.

While a specific embodiment of the invention has been shown and described in detail to illustrate the application of the inventive principles, it will be understood that the invention may be embodied otherwise without departing from such principles.

What is claimed is:

1. Device for loading workpieces comprising a machine rotating about an axis, said machine having at least one receiving portion thereon spaced radially outwardly from its axis and arranged to receive a workpiece, means spaced from said machine for supporting a stationary supply of workpieces, and means for transporting workpieces from the stationary supply to said machine, said means for transporting workpieces comprises an endless member, at least one carrying element attached to said endless member for holding a workpiece as it is moved from the stationary supply of workpieces to the receiving portion on said machine, said endless member moving said carrying elements at least during a portion of its travel at a speed equal to the speed of travel of the receiving portion on said machine, and a supporting member forming a track defining an arc of a circle for said endless member in a portion of its path of travel, the position of said supporting member being adjacent said means for supporting a stationary supply of workpieces and being spaced from said machine, and said carrying element being attached to said endless member so that in the passage over the track formed by said supporting member of the portion of said endless member to which said carrying member is attached, said carrying element effects a rotary movement about its axis while its axis remains stationary so that a workpiece can be moved from the stationary supply into said carrying element while its axis remains in the stationary position, a plurality of said supporting members are arranged in spaced relationship for the passage of said endless member thereover, said means for transporting workpieces includes a fixed curved guideway forming an arc of a circle with its center of curvature coinciding with the axis of said machine, said guideway defining the path of travel of said endless member with its carrying element in alignment with the receiving portion of said machine for effecting the transfer of a workpiece from the carrying element to the receiving portion, said endless member comprises a chain formed of a plurality of links, a plurality of said carrying elements located at uniformly spaced positions on said chain and each said carrying elements secured to and extending laterally and perpendicularly from one of said links, and said means for transporting workpieces includes a pair of said supporting members, said supporting members being spaced apart at a multiple of the spacing between said carrying elements, said supporting members comprising first sprocket wheels, each having a radius to the point of engagement with said links of said chain equal to the dimension between the center of said chain and the center of said carrying elements.

2. Device for loading workpieces, as set forth in claim 1, wherein said means for transporting workpieces includes a pair of second chain wheels each having a radius greater than said first chain wheels with each said second chain wheel located adjacent an opposite end of said fixed curved guideway.

3. Device for loading workpieces, as set forth in claim 2, wherein said machine comprises a rotatable wheel secured on a shaft, a plurality of mandrels equiangularly mounted on the periphery of said wheel, said means for supporting a stationary supply of workpieces comprises a pair of spaced guideways each arranged to hold a plurality of workpieces, means for individually feeding the workpieces from said guideways to said carrying elements, and said carrying elements comprising tubular members each arranged to receive a workpiece from one of said stationary guideways and to transport the workpiece until said carrying element is aligned with one of said mandrels on said wheel for transferring the workpiece to said mandrel, and means for displacing the workpieces from said guide to said carrying element and from said carrying element to said mandrel.

* * * * *